(12) United States Patent
Oleson (10) Patent No.: US 11,548,645 B2
(45) Date of Patent: Jan. 10, 2023

(54) INTERLINKED PLINTH ATTACHMENT SYSTEM FOR AIRCRAFT SEATS

(71) Applicant: B/E Aerospace, Inc., Winston-Salem, NC (US)

(72) Inventor: Michael L. Oleson, Parkland, FL (US)

(73) Assignee: B/E Aerospace, Inc., Winston, Salem, NC (US)

( * ) Notice: Subject to any disclaimer, the term of this patent is extended or adjusted under 35 U.S.C. 154(b) by 560 days.

(21) Appl. No.: 16/545,447

(22) Filed: Aug. 20, 2019

(65) Prior Publication Data

US 2020/0062405 A1 Feb. 27, 2020

Related U.S. Application Data

(60) Provisional application No. 62/721,934, filed on Aug. 23, 2018.

(51) Int. Cl.
*B64D 11/06* (2006.01)
*A47C 7/00* (2006.01)
*A47C 3/18* (2006.01)

(52) U.S. Cl.
CPC ............ *B64D 11/0696* (2013.01); *A47C 3/18* (2013.01); *A47C 7/004* (2013.01);
(Continued)

(58) Field of Classification Search
CPC ............ B64D 11/0696; B64D 11/0648; B60N 2/2869
See application file for complete search history.

(56) References Cited

U.S. PATENT DOCUMENTS 4,674,713 A * 6/1987 Ryan .................. B64D 11/06
  244/118.6
4,729,601 A * 3/1988 Walle .................. B64D 11/06
  297/344.1
(Continued)

FOREIGN PATENT DOCUMENTS

CN 104093631 A 10/2014
CN 105658518 A 6/2016
(Continued)

OTHER PUBLICATIONS

International Search Report for Application No. EP19193396.9-1010 dated Dec. 18, 2019.
(Continued)

*Primary Examiner* — Brady W Frazier
*Assistant Examiner* — Shanna Danielle Glover
(74) *Attorney, Agent, or Firm* — Suiter Swantz pc llo (57) ABSTRACT

A plinth attachment system for attachment to at least one track includes: a first plate having a first side configured for mounting to a longitudinally extending track, and a first mounting feature for mounting a first structure; and a second plate having a first side configured for mounting to the track, and a second mounting feature for mounting a second structure. When mounted on the track, at least one interlinking feature of the first side of the first plate and at least one interlinking feature of the first side of the second plate interlock at the track, and, the first mounting feature and second mounting feature are aligned at essentially equivalent longitudinal positions.

18 Claims, 6 Drawing Sheets

(52) U.S. Cl.
CPC ...... *B64D 11/0639* (2014.12); *B64D 11/0648* (2014.12); *B64D 11/0693* (2013.01)

(56) References Cited

U.S. PATENT DOCUMENTS

| | | | | |
|---|---|---|---|---|
| 4,834,452 | A * | 5/1989 | Goodrich | B64D 11/0696 |
| | | | | 297/240 |
| 5,620,161 | A | 4/1997 | Wisner et al. | |
| 5,904,407 | A * | 5/1999 | Larson | B64D 11/0696 |
| | | | | 297/452.21 |
| 6,659,402 | B1 * | 12/2003 | Prochaska | B64D 11/0696 |
| | | | | 244/118.6 |
| 8,544,796 | B2 | 10/2013 | Pozzi et al. | |
| 9,139,303 | B2 | 9/2015 | Bechtold et al. | |
| 9,481,467 | B2 | 11/2016 | Oleson | |
| 9,896,185 | B2 | 2/2018 | Cullen et al. | |
| 2014/0191081 | A1 | 7/2014 | Ward et al. | |
| 2015/0108273 | A1 | 4/2015 | Oleson | |
| 2016/0214719 | A1 * | 7/2016 | Thomaschewski | |
| | | | | B64D 11/0696 |
| 2019/0029429 | A1 * | 1/2019 | Browning | A47C 4/02 |

FOREIGN PATENT DOCUMENTS

| | | |
|---|---|---|
| WO | 2017/081128 A1 | 5/2017 |
| WO | 2017081128 A1 | 5/2017 |

OTHER PUBLICATIONS

Examination Report for European Application No. 19193396.9 dated Nov. 3, 2020, 4 pages.

Office Action and Search Report in Chinese Application No. 2019107828701 dated Oct. 14, 2022, 19 pages (with English Translation).

* cited by examiner

INTERLINKED PLINTH ATTACHMENT SYSTEM FOR AIRCRAFT SEATS

CROSS REFERENCE TO RELATED APPLICATION

This application claims the benefit of priority of U.S. provisional patent application No. 62/721,934, filed Aug. 23, 2018, entitled "Interlinked Plinth Attachment System for Aircraft Seats," which is incorporated herein in its entirety by this reference.

BACKGROUND

Commercial aircraft cabins are typically configured to accept seating designed specifically to attach to existing longitudinal seat tracks. These existing seat tracks may run primarily parallel to the aircraft centerline over the length of the cabin. Multiple seat tracks may be spaced across the width of the aircraft to provide attachment locations primarily for seating products and furniture. The lateral spacing of the seat tracks may be unique to the aircraft type. Commercial-type seats are typically multi-place seats ranging from double seats to seats made for up to five passengers. These commercial-type seats may be attached directly to the seat tracks using industry standard attachment fittings.

Aircraft may also be configured for executive use. Individuals, corporations, fractional ownership companies, and others typically configure cabins in a different manner than for commercial use. These executive cabins may utilize single and multi-place seats, side-facing divans, and other specialty seating for added comfort. In addition, interior components (e.g., bulkheads, credenzas) may be added to configure the cabin in a custom manner. As such, executive seating and interior components often have different lateral leg spacing that does not coincide with the standard/existing seat track locations. Moreover, some aircraft do not have seat tracks, and provide only longitudinal floor beams that require all attachments to utilize special attachment fittings. This attachment scheme requires that all seats be designed or redesigned to utilize these fittings, often warranting new certification.

Therefore, to facilitate installation flexibility and allow custom seat, furniture, bulkhead, etc. placement within the aircraft cabin, what is needed is a system that makes use of the existing seat tracks in the aircraft to provide additional attachment points for attaching seats, furniture, bulkheads, etc.

SUMMARY OF THE INVENTIVE ASPECTS

To achieve the foregoing and other advantages, the inventive aspects disclosed herein are directed to a plinth attachment system for attachment to at least one track. The system includes a first plate having a first side configured for mounting to a longitudinally extending track and a first mounting feature for mounting a first structure, and a second plate having a first side configured for mounting to the track and a second mounting feature for mounting a second structure. When mounted on the track, at least one interlinking feature of the first side of the first plate and at least one interlinking feature of the first side of the second plate interlock at the same track, and, the first mounting feature and second mounting feature are aligned at essentially equivalent longitudinal positions.

In some embodiments, the first interlinking feature includes at least two first support plates extending laterally from the first side of the first plate, and the second interlinking feature includes at least one second support plate extending laterally from the first side of the second plate and between the two first support plates.

In some embodiments, the first interlinking feature includes at least two first support plates extending laterally from the first side of the first plate, and the second interlinking feature includes at least two second support plates extending laterally from the first side of the second plate, and wherein the first support plates are interdigitated with the second support plates.

In some embodiments, each first support plate and each second support plate has a respective slot-shaped opening for receiving a connector for attachment to the track, and the slot-shaped openings of the first support plates are perpendicular to the slot shaped openings of the second support plates.

In some embodiments, the first mounting feature includes at least one of an opening in the first plinth plate and a first pedestal, and the second mounting feature includes at least one of an opening in the second plinth plate and a second pedestal.

In some embodiments, the first plate has a second side opposite the first side thereof, the second side configured for mounting to a longitudinally extending left track, and the second plate has a second side opposite the first side thereof, the second side configured for mounting to a longitudinally extending right track. The left track and right track are parallel to and equidistant from the longitudinally extending track.

In another aspect, the inventive concepts disclosed herein are directed to an aircraft seating attachment system for attachment to at least one track. The system includes a first plate having a first side configured for mounting to a longitudinally extending track and a first mounting feature for mounting a first aircraft seat, and a second plate having a first side configured for mounting to the track and a second mounting structure for mounting a second aircraft seat. When mounted on the track, at least one interlinking feature of the first side of the first plate and at least one interlinking feature of the first side of the second plate interlock at the track, and, the first mounting feature and second mounting feature are aligned at essentially equivalent longitudinal positions.

In some embodiments, the first interlinking feature includes at least two first support plates extending laterally from the first side of the first plate, and the second interlinking feature includes at least one second support plate extending laterally from the first side of the second plate and between the two first support plates.

In some embodiments, the first interlinking feature includes at least two first support plates extending laterally from the first side of the first plate, the second interlinking feature includes at least two second support plates extending laterally from the first side of the second plate, and the first support plates are interdigitated with the second support plates.

In some embodiments, each first support plate and each second support plate has a respective slot-shaped opening for receiving a connector for attachment to the track, and the slot-shaped openings of the first support plates are perpendicular to the slot shaped openings of the second support plates.

In some embodiments, the first mounting feature comprises a first pedestal, and wherein the second mounting feature comprises a second pedestal.

In some embodiments, the first plate has a second side opposite the first side thereof, the second side configured for mounting to a longitudinally extending left track, the second plate has a second side opposite the first side thereof, the second side configured for mounting to a longitudinally extending right track, and the left track and right track are parallel to and equidistant from the longitudinally extending track.

In another aspect, the inventive concepts disclosed herein are directed to an aircraft seating arrangement including: a longitudinally extending seat track; a first plinth plate having a first side attached to the seat track; a first aircraft seat attached to the first plinth plate; a second plinth plate having a first side attached to the seat track; and a second aircraft seat attached to the second plinth plate. At least one interlinking feature of the first side of the first plinth plate and at least one interlinking feature of the first side of the second plinth plate interlock at the seat track, and, the first aircraft seat and the second aircraft seat are aligned at essentially equivalent longitudinal positions relative to the seat track.

In some embodiments, the first interlinking feature includes at least two first support plates extending laterally from the first side of the first plate, and wherein the second interlinking feature includes at least one second support plate extending laterally from the first side of the second plate and between the two first support plates.

In some embodiments, the first interlinking feature includes at least two first support plates extending laterally from the first side of the first plate, the second interlinking feature includes at least two second support plates extending laterally from the first side of the second plate, and the first support plates are interdigitated with the second support plates.

In some embodiments, each first support plate and each second support plate has a respective slot-shaped opening for receiving a connector for attachment to the seat track, and the slot-shaped openings of the first support plates are perpendicular to the slot shaped openings of the second support plates.

In some embodiments, a first pedestal attaches the first aircraft seat to the first plinth plate, and a second pedestal attaches the second aircraft seat to the second plinth plate.

In some embodiments, the first pedestal is aligned above and surrounds a circular central opening in the first plinth plate, and the second pedestal is aligned above and surrounds a circular central opening in the second plinth plate.

In some embodiments, a left seat track and a right seat track are parallel to and equidistant from the longitudinally extending seat track, the first plinth plate has a second side opposite the first side thereof and attached to the left seat track, and the second plate has a second side opposite the first side thereof and attached to the right seat track.

In some embodiments, at least one of the first aircraft seat and second aircraft seat is a swivel seat.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Referring to the figures, an interlinked plinth attachment system for aircraft seats is disclosed herein. The attachment system allows for the installation of two or more adjacently positioned seats on an aircraft floor where a seat track between the seats is shared for installation. An interlinked feature of the two plinth assemblies of the attachment system allows for the seats to be placed at longitudinally equivalent or near-equivalent positions with respect to the seat tracks, thereby facilitating an in-line seating installation in which adjacent seats appear as non-staggered despite that interlinked features of the plinth assemblies upon which they mount are staggered. This serves aesthetics and conforms to expected seat layouts while maintaining, for each seat, a similar load interface between the seat and aircraft frame by way of the seat tracks that convey forces between the seats and frame.

Figure 1:
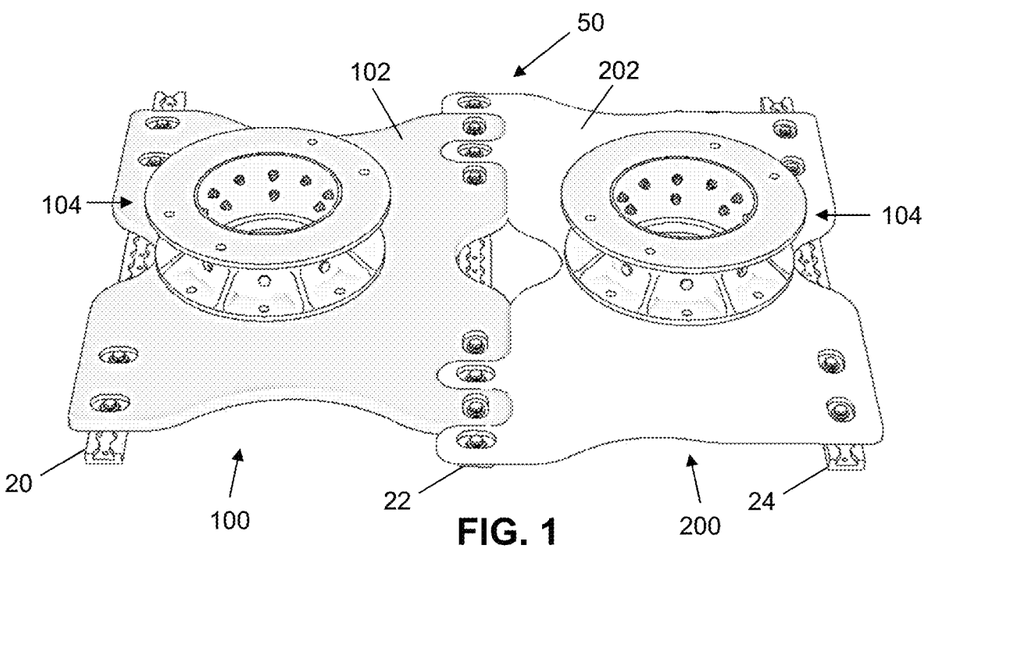
FIG. 1 is a top perspective view of an interlinked plinth attachment system, according to the present disclosure, for attaching aircraft seats to the floor of an aircraft cabin.
Figure 2:
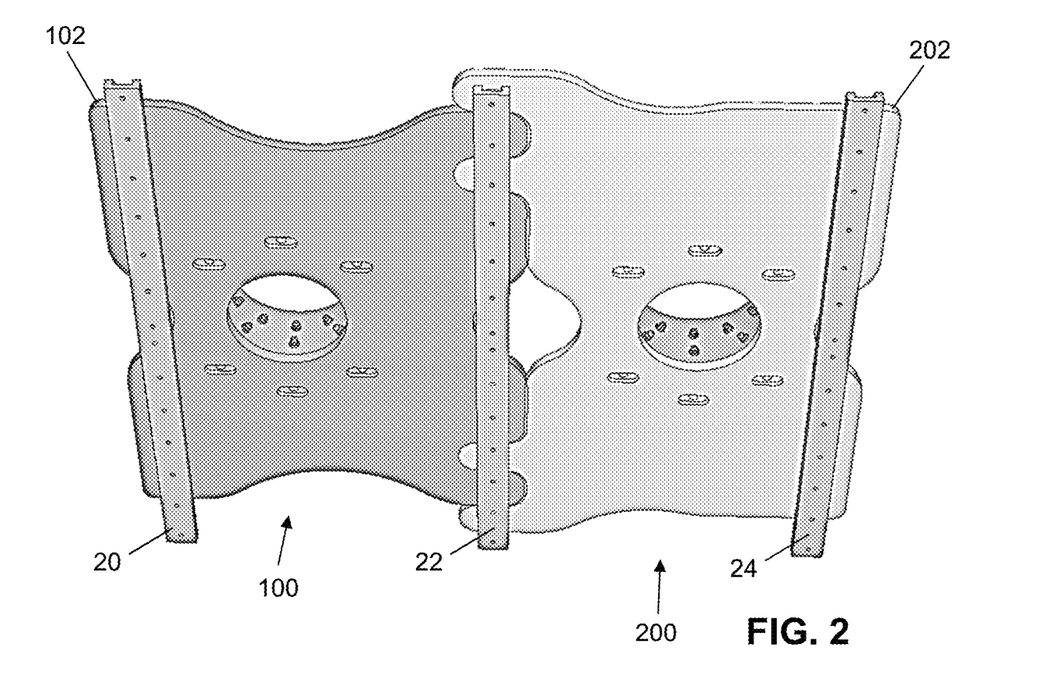
FIG. 2 is a bottom perspective view of the interlinked plinth attachment system of FIG. 1.
Figure 3:
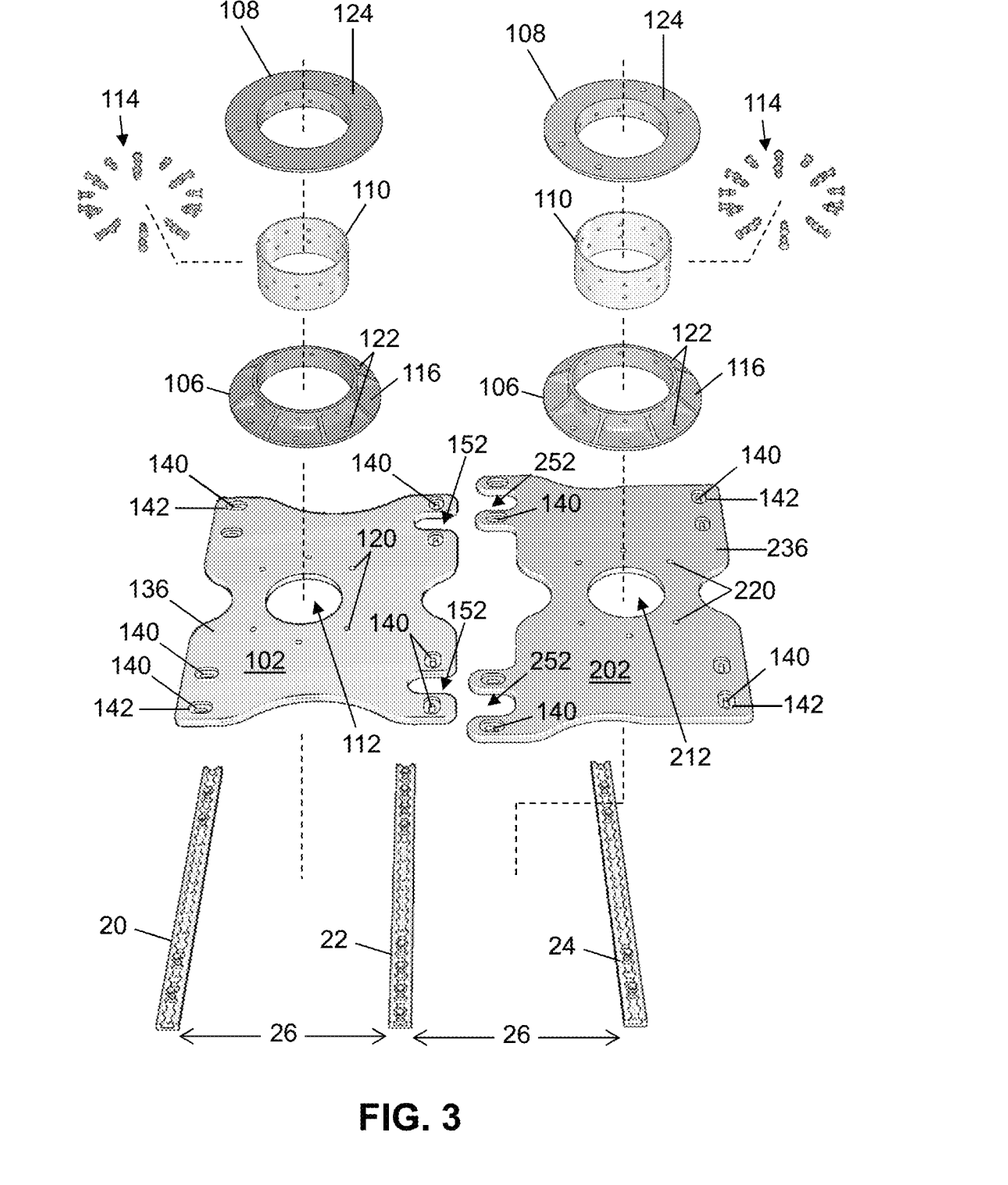
FIG. 3 is an exploded perspective view of the interlinked plinth attachment system of FIG. 1.

FIG. 1 depicts two adjacently positioned plinth assemblies installed upon aircraft seat tracks. The aircraft seat tracks shown include three parallel spaced tracks including a first or left track 20, a second or middle track 22, and a third or right track 24. The second track 22 is disposed between the first track 20 and the third track 24, equidistance therefrom. The lateral spacing 26 (FIG. 3) between the respective adjacent seat tracks may vary depending on the custom layout of the aircraft floor. The seat tracks may run fore and aft along a portion of the length of an aircraft cabin, side to side along a portion of the width of the cabin, or along an oblique angle relative to the fuselage of an aircraft, depending on the custom layout of the aircraft floor or passenger environment. Accordingly, the seat tracks are described herein as extending longitudinally, parallel to each other, and separated by a prescribed lateral spacing 26, without limitation as to orientation relative to the host aircraft where seats are to be installed upon the two plinth assemblies of the illustrated attachment system.

The interlinked plinth attachment system 90 includes a first plinth assembly 100 configured to be installed upon the first track 20 and the second track 22, spanning the lateral spacing therebetween. A second plinth assembly 200 is configured to be installed upon the second track 22 and the third track 24, spanning the lateral spacing therebetween. The first and second plinth assemblies 100 and 200 are configured to be affixed to their respective seat tracks, for example, utilizing seat track fasteners as described below with reference to FIGS. 6-9.

The first plinth assembly 100 includes a generally planar first plinth plate 102 that connects to the first track 20 and second track 22 upon installation. A first pedestal 104 is connected to the top side of the first plinth plate 102. The first pedestal 104 is illustrated as having a lower ring 106 (FIG. 3) that attaches to the plinth plate 102, and an upper ring 108 that attaches to the lower ring 106 by way of an internal ring 110. The lower ring, internal ring, and upper ring are aligned above and surround a circular central first opening 112 that defines a swivel axis in implementations in which swiveling seats are used. The lower ring, internal ring, and upper ring are attached together by connectors 114 such as bolts and nuts and any washers therewith.

The lower ring 106 has an annular flange 116 that abuts the plinth plate 102. Holes 120 through the plinth plate 102 are shown as radially disposed around the central opening 112. Corresponding holes 122 through the flange 116 are aligned with the holes to receive connectors such as bolts by which the first pedestal 104 is attached to the first plinth plate 102. The upper ring 108 has an annular flange 124, also having holes for receiving connectors, for mounting a seat, such as a swivel seat, above the pedestal 104. The upper ring 108 can be modified or configured to suit various types of seats to be installed. For example, the pattern of the holes may be changed between implementations to align with holes in the mounting hardware or structures of various seat types.

The second plinth assembly 200 similarly includes a generally planar second plinth plate 202 that connects to the second track 22 and third track 24 upon installation. A second pedestal, which is also referenced as pedestal 104 for brevity in these descriptions, has a lower ring 106, internal ring 110, and upper ring 108, as already described, is connected to the top side of the second plinth plate 202 aligned above and surrounding a circular central second opening 212.

The first plinth plate 102 has a first longitudinal end 130 (FIG. 4) directed toward a first longitudinal direction 30, and an opposing second longitudinal end 132 directed toward a second longitudinal direction 32 opposite the first longitudinal direction. The opposing lateral sides of the first plinth plate 102 are directed respectively laterally inward and outward with respect to a longitudinally extending approximate center line 34 of the interlinked plinth attachment system 90. Thus, a first lateral side of the first plinth plate 102 is referenced as an inner side 134 laterally directed toward the second plinth assembly 200, and a second lateral side opposite the first side is referenced as an outer side 136 laterally directed away therefrom. The outer side 136 of the first plinth plate 102 overhangs the first seat track 20. Openings 140 are defined through the first plinth plate 102 along the outer side 136 to receive connectors by which the plinth plate is attached to the first seat track 20, for example, utilizing seat track fasteners as described below with reference to FIGS. 6-9.

The second plinth plate 202 similarly has a first longitudinal end 230 directed toward the first longitudinal direction 30, and an opposing second longitudinal end 232 directed toward the second longitudinal direction 32. The opposing lateral sides of the second plinth plate are directed respectively laterally inward and outward with respect to the center line 34 of the interlinked plinth attachment system 90. Thus, a first lateral side of the second plinth plate 102 is referenced as an inner side 234 laterally directed toward the first plinth assembly 100, and a second lateral side thereof is referenced as an outer side 236 laterally directed away therefrom. The outer side 236 of the second plinth plate 202 overhangs and abuts the third seat track 24. Openings 140 are defined through the second plinth plate 202 to receive connectors for attachment to the third seat track 24, for example as described below with reference to FIGS. 6-9.

Figure 10:
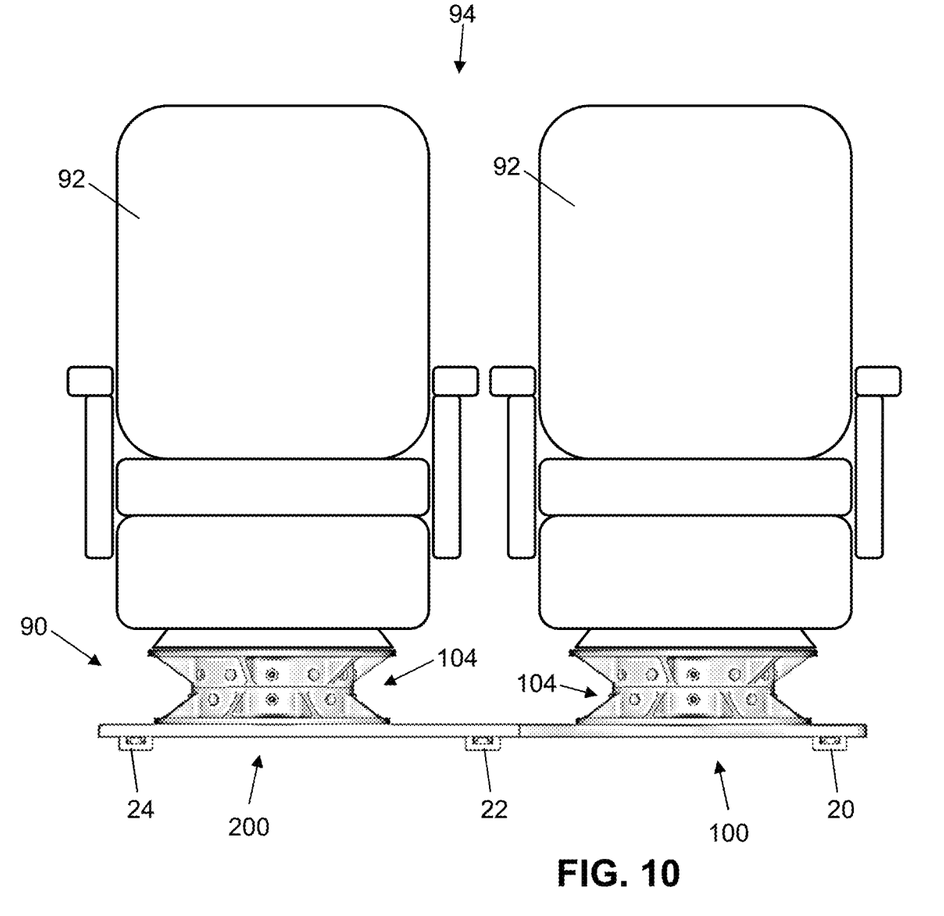
FIG. 10 is an elevation view of the interlinked plinth attachment system as in FIG. 5, additionally showing aircraft seats attached to the pedestals of the plinth assemblies.

Each plinth plate 102 and 202 as shown has a generally rectangular overall shape according to the opposing longitudinal ends and opposing lateral sides of each. The inner lateral sides 134 and 234 are shaped to mutually interlink or interlock in mating engagement atop the second track 22, thereby preventing translational movement between plates along a longitudinal direction. The interlocking features allow the two plinth assemblies 100 and 200 to be installed side-by-side with their respective longitudinal ends substantially aligned, and more importantly, with the respective large central openings 112 and 212 and the pedestals 104 longitudinally placed at equivalent longitudinal positions. In FIG. 10, the interlinked plinth attachment system 90 serves as an aircraft seating attachment system in a seating arrangement. Aircraft seats 92 installed laterally adjacent one another in an aircraft seating arrangement 94 (FIG. 10) are longitudinally aligned and space is provided therebetween for allowing passthrough. The alternating design of the interlocking features, which may take the form of sinusoidal, castellated or like features, allows the inner side of each plinth plate to align above and utilize alternating positions in the seat tracks for attachment utilizing fasteners.

Each plinth plate 102 and 202 is shown as having a cutout 36 (FIG. 4) in each longitudinal end and in each lateral side, defining a butterfly design, for weight and material saving. Additional features to the plinth plates may include, but are not limited to, additional openings and cutouts to reduce weight, shape changes, material changes, etc.

The interlocking features along the inner lateral sides of the plinth plates are illustrated as laterally extending contiguous plinth plate portions. Along the center line 34 of the interlinked plinth attachment system 90, the inner sides 134 and 234 of the plinth plates 102 and 201 are interlinked to share the second seat track 22. Portions of the first plinth plate 102 extend laterally from the inner side 134 thereof as longitudinally separated first support plates 150. Each first support plate has at least one opening 140 to receive a connector for attachment to the second seat track 22, for example as described below with reference to FIGS. 6-9. Slots 152 (FIG. 3) are defined between at least some of the first support plates 150 to receive support plates 250 extending from the second plinth plate 202. Two first support plates 150 proximate the first longitudinal end 130 and two first support plates 150 proximate the second longitudinal end 132 are shown in the drawings (FIG. 4) as a non-limiting example. Other configurations may be provided in other implementation.

Portions of the second plinth plate 202 extend laterally from the inner side 234 thereof as longitudinally separated second support plates 250. Each second support plate has at least one opening 140 to receive a connector for attachment to the second seat track 22, for example as described below with reference to FIGS. 6-9. Slots 252 (FIG. 3) are defined between at least some of the second support plates 250 to receive first support plates 150 extending from the first plinth plate 102, thereby defining an interlinked or interdigitated arrangement of portions of the first and second plinth plates and a serpentine junction of the inner sides 134 and 234 of the plinth plates 102 and 202. Two second support plates 250 proximate the first longitudinal end 230 and two second support plates 250 proximate the second longitudinal end 232 are shown in the drawings (FIG. 4) as a non-limiting example. Other configurations may be provided in other implementation.

While two plinth assemblies 100 and 200, each with a respective plinth plate 102 and 202, are shown in the drawings, multiple plinth assemblies and/or plinth plates of any number can be aligned and interfaced laterally and/or longitudinally adjacent. Thus, each plinth assembly and/or plinth plate can be configured with interlocking features along one, two, three or four edges for interfacing with from one to four other plinth assemblies and/or plinth plates.

The openings 140 formed through the plinth plates for receiving connectors by which the plates are to be connected to the seat tracks may be countersunk. A counter sink 142 (FIG. 3,6) can be formed along the top side of each plinth plate at each opening 140 to receive, for example, connector heads such as bolt heads, and washers, below or flush with the upper surface of the plate.

The openings 140 formed through the plinth plates for receiving connectors by which the plates are to be connected to the seat tracks may be non-circular, shaped as slots, to accommodate assembly tolerances, slight misalignment, and slight warpage that can occur in a floor and/or the seat tracks. The respective counter sinks 142 are correspondingly non-circular, shaped as channels surrounding and parallel to their slot-shaped openings. The arrangement shown in FIG. 1 is particularly advantageous with regard to accommodating assembly tolerances, slight misalignment, and slight warpage.

The slot-shaped openings 140 along the outer side 136 of the first plinth plate 102 are formed as laterally extending slots that are perpendicular to the parallel seat tracks and longitudinally extending approximate center line 34 of the interlinked plinth attachment system 90. The slot-shaped openings 140 along the inner side 134 of the first plinth plate 102 are formed as longitudinally extending slots that are parallel to the parallel seat tracks and longitudinally extending approximate center line 34. Accordingly, the slot-shaped openings 140 for receiving connectors for attachment to the first seat track 20 along the outer side 136 of the first plinth plate 102 are perpendicular to the slot-shaped openings 140 through the support plates 150 along the inner side 134 of the first plinth plate 102.

The slot-shaped openings 140 along the outer side 236 of the second plinth plate 102 are formed as longitudinally extending slots that are parallel to the parallel seat tracks and longitudinally extending approximate center line 34. The slot-shaped openings 140 through the second support plates 250 along the inner side 234 of the second plinth plate 202 are laterally extending slots that are perpendicular to the parallel seat tracks and longitudinally extending approximate center line 34 of the interlinked plinth attachment system 90. Accordingly, the slot-shaped openings 140 for receiving connectors for attachment to the third seat track 24 along the outer side 236 of the second plinth plate 202 are perpendicular to the slot-shaped openings 140 through the support plates 250 along the inner side 234 of the second plinth plate 202.

Figure 4:
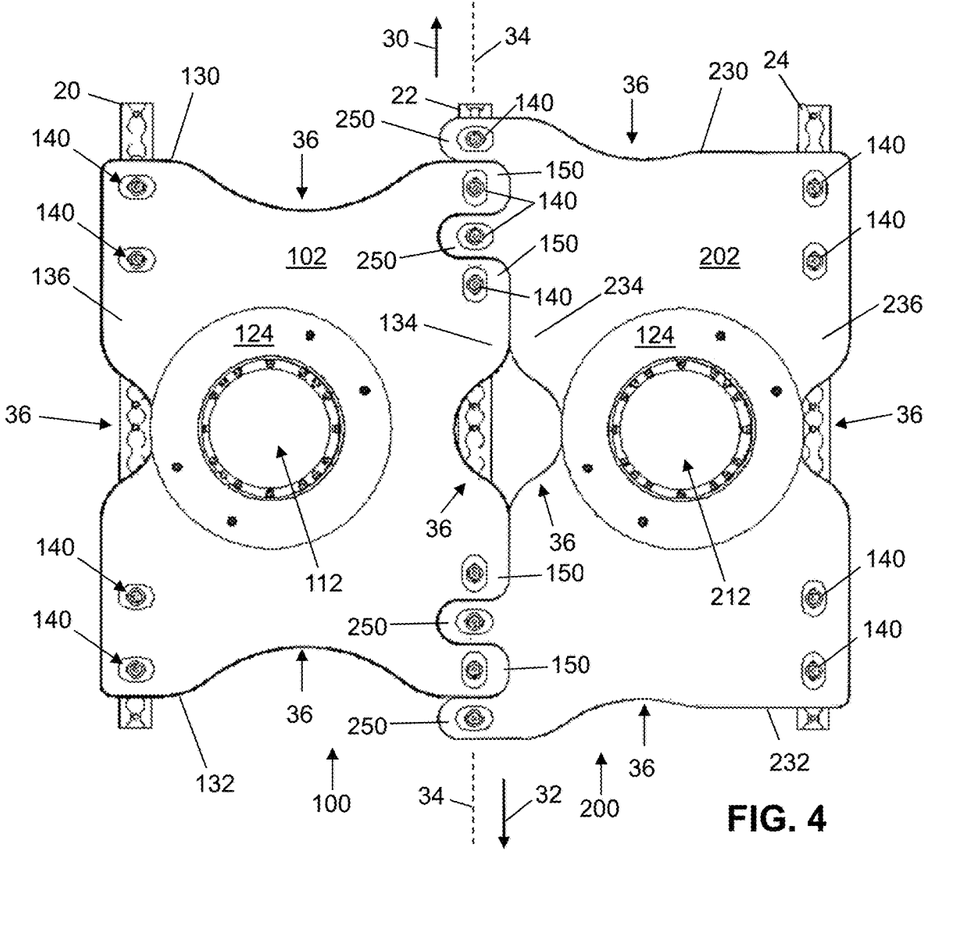
FIG. 4 is a top isometric view of the interlinked plinth attachment system of FIG. 1.
Figure 5:
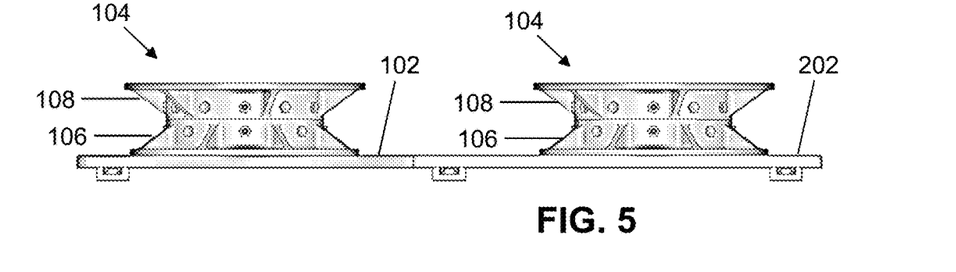
FIG. 5 is an elevation view of the interlinked plinth attachment system of FIG. 1.
Figure 6:
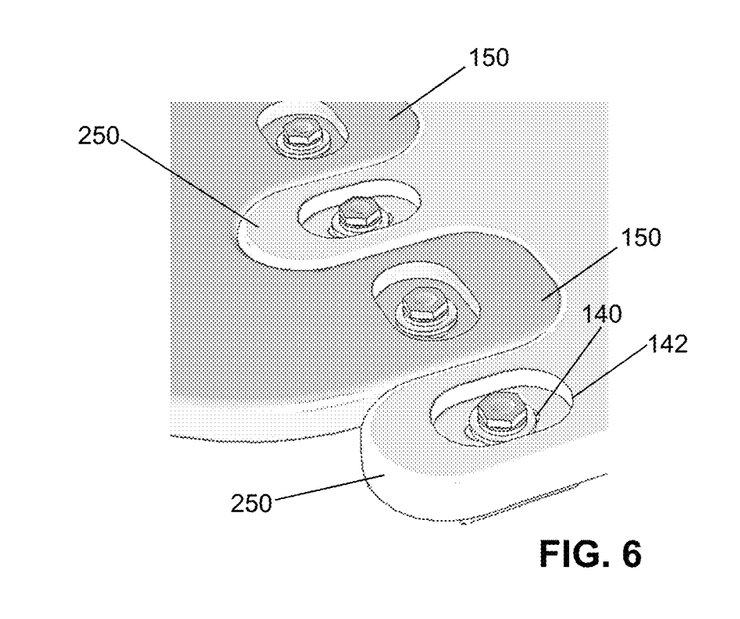
FIG. 6 is a perspective view of a track mounted portion of the interlinked plinth attachment system of FIG. 1.

Accordingly, as shown in FIG. 4, the slot-shaped openings 140 in the first support plates 150 and 250 along the inner sides 134 and 234 near the first longitudinal ends 130 and 230 are arranged as parallel to the seat track 22 and perpendicular to the seat track 22 in alternating fashion.

Figure 7:
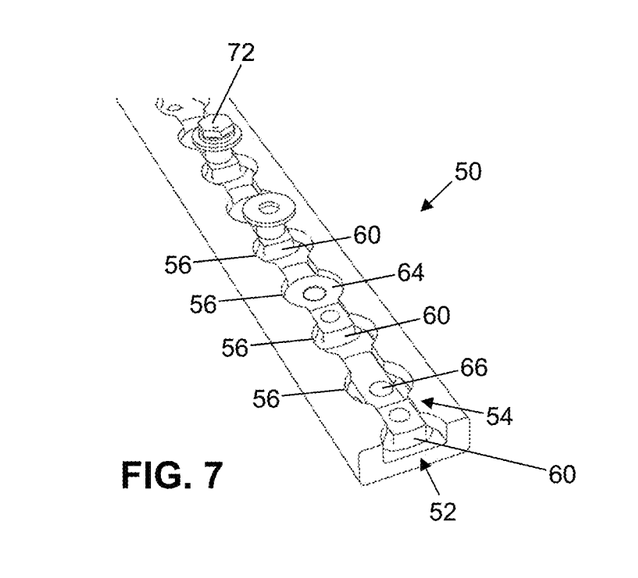
FIG. 7 is a perspective view of a seat track and fastening components for attaching the interlinked plinth attachment system of FIG. 1 to the floor of an aircraft cabin.
Figure 8:
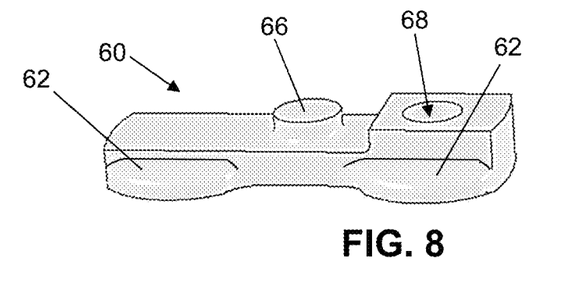
FIG. 8 is a perspective view of a track fastener.
Figure 9:
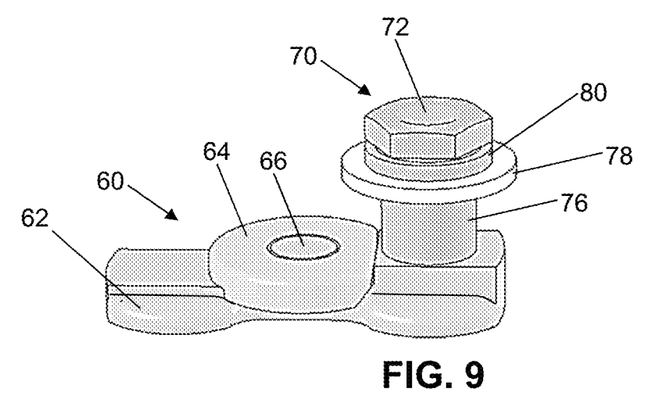
FIG. 9 is a perspective view of the track fastener of FIG. 8, shown with additional fastening components.

Each seat track referenced in the drawings as the left track 20, middle track 22, and right track 24, is represented in FIG. 7 as seat track 50, of which one description suffices. The seat track 50 in FIG. 7, defines a longitudinally extending T-channel 52 having an upward opening slot 54. The slot has circular widenings 56 that define indexed positions along the seat track. The bottom of a sliding seat track fastener 60 (FIGS. 8-9) has a longitudinally spaced shoulders 62 that can enter the T-channel from a longitudinal end of a seat track. The shoulders 62 are too laterally wide to escape the T-channel through the upward facing slot 54. Once inserted into the channel 52, the fastener 60 can slide along the seat track, with the shoulders 62 trapped in the T-channel, to a position where installation is to occur. An indexing ring 64 is used to register and maintain the fastener 60 at a prescribed position by engaging both a post 66 extending upward from the fastener and a particular widening 56 where installation is to occur. The indexing ring 64 can be received by the post 66 only at indexed positions where the post is concentric with a circular widening 56, thus placement of the fastener 60 at a prescribed position is assured.

Installation is completed using a connector 70 such as a bolt having a threaded end that engages an internally threaded bore 68 in the fastener 60 and a head 72, illustrated as hexagonal, that engages for example a plinth plate thereby securing the plinth plate to the fastener 60 and seat track. A cylindrical spacer 76, a primary washer 78, and a secondary washer 80 are placed between the fastener 60 and the head 72 of the connector 70 for improved material engagement and secure attachment of the plinth plate to the fastener 60 and seat track.

Upon installation on the seat tracks, the interlinking feature(s) of the first side or inner side 134 of the first plinth plate 102, for example the support plates 150, and the interlinking feature(s) of the first side or inner side 234 of the second plinth plate 202 interlock at the second track 22. Also, upon installation, the mounting feature(s) on the first plinth plate 102 such as the central opening 112 and/or the pedestal 104, and second mounting feature(s) on the second plinth plate 202, such as the central opening 212 and/or pedestal 104, are aligned at essentially equivalent longitudinal positions. Accordingly, additional structures, for example the seats 92 (FIG. 10), when mounted on the pedestals 104, are also placed at longitudinally equivalent or near-equivalent positions with respect to the seat tracks, thereby facilitating an in-line seating installation in which adjacent seats appear as non-staggered despite that interlinked features of the plinth assemblies upon which they mount are staggered.

The interlinked plinth attachment system 90 as described an illustrated is intended to permit seat certification to the Federal Aviation Regulations (14 CFR Part 25) and SAE Technical Standard Order (TSO-C127). The seat attachment plinths are designed with features to allow floor warpage to be induced to the seat prior to the crash. Alternative seat mounting hardware can be affixed to the plinths including, but not limited to, conventional bases including rails and spars, a mini-base having shortened footprint rails and spars, etc.

The interlinked plinth attachment system 90 is described above as useful for mounting seats 92 as shown in FIG. 10, for example swivel seats mounted on the pedestals 104. Additionally, the plinth plates, with or without the pedestals in various implementations, are useful as well for mounting other structures, such as other custom seats, furniture, bulkheads, monuments, etc.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A plinth attachment system for attachment to at least one track, the system comprising:
    a first plate having a first side configured for mounting to a longitudinally extending track, and a first mounting feature for mounting a first structure; and
    a second plate having a first side configured for mounting to the track, and a second mounting feature for mounting a second structure;
    wherein, when mounted on the track, at least one interlinking feature of the first side of the first plate and at least one interlinking feature of the first side of the second plate interlock at the track,
    wherein, when mounted to the track, the first mounting feature and second mounting feature are aligned at essentially equivalent longitudinal positions, and
    wherein the first mounting feature comprises a central opening formed through the first plate and a pedestal, the pedestal comprising a lower ring attached to the first plate and an upper ring attached to the lower ring by way of an internal ring, wherein the lower ring, the internal ring and the upper ring collectively define a central opening aligned above and surrounding the central opening formed through the first plate such that a continuous opening is formed through the first plate and the pedestal.

2. The plinth attachment system of claim 1, wherein the first interlinking feature comprises at least two first support plates extending laterally from the first side of the first plate, and wherein the second interlinking feature comprises at least one second support plate extending laterally from the first side of the second plate and between the two first support plates.

3. The plinth attachment system of claim 1, wherein the first interlinking feature comprises at least two first support plates extending laterally from the first side of the first plate, wherein the second interlinking feature comprises at least two second support plates extending laterally from the first side of the second plate, and wherein the first support plates are interdigitated with the second support plates.

4. The plinth attachment system of claim 3, wherein each first support plate and each second support plate has a respective slot-shaped opening for receiving a connector for attachment to the track, and wherein the slot-shaped openings of the first support plates are perpendicular to the slot shaped openings of the second support plates.

5. The plinth attachment system of claim 1, wherein the second mounting feature comprises a central opening formed through the second plate and a pedestal, the pedestal comprising a lower ring attached to the second plate and an upper ring attached to the lower ring by way of an internal ring, wherein the lower ring, the internal ring and the upper ring collectively define a central opening aligned above and surrounding the central opening formed through the second plate such that a continuous opening is formed through the second plate and the pedestal.

6. The plinth attachment system of claim 1, wherein the first plate has a second side opposite the first side thereof, the second side configured for mounting to a longitudinally extending left track, and wherein the second plate has a second side opposite the first side thereof, the second side configured for mounting to a longitudinally extending right track, and wherein the left track and right track are parallel to and equidistant from the longitudinally extending track.

7. An aircraft seating attachment system for attachment to at least one track, the system comprising:
    a first plate having a first side configured for mounting to a longitudinally extending track, and a first mounting feature for mounting a first aircraft seat; and
    a second plate having a first side configured for mounting to the track, and a second mounting structure for mounting a second aircraft seat;
    wherein, when mounted on the track, at least one interlinking feature of the first side of the first plate and at least one interlinking feature of the first side of the second plate interlock at the track,
    wherein, when mounted to the track, the first mounting feature and second mounting feature are aligned at essentially equivalent longitudinal positions, and
    wherein the first mounting feature comprises a central opening formed through the first plate and a pedestal, the pedestal comprising a lower ring attached to the first plate and an upper ring attached to the lower ring by way of an internal ring, wherein the lower ring, the internal ring and the upper ring collectively define a central opening aligned above and surrounding the central opening formed through the first plate such that a continuous opening is formed through the first plate and the pedestal.

8. The aircraft seating attachment system of claim 7, wherein the first interlinking feature comprises at least two first support plates extending laterally from the first side of the first plate, and wherein the second interlinking feature comprises at least one second support plate extending laterally from the first side of the second plate and between the two first support plates.

9. The aircraft seating attachment system of claim 7, wherein the first interlinking feature comprises at least two first support plates extending laterally from the first side of the first plate, wherein the second interlinking feature comprises at least two second support plates extending laterally from the first side of the second plate, and wherein the first support plates are interdigitated with the second support plates.

10. The aircraft seating attachment system of claim 9, wherein each first support plate and each second support plate has a respective slot-shaped opening for receiving a connector for attachment to the track, and wherein the slot-shaped openings of the first support plates are perpendicular to the slot shaped openings of the second support plates.

11. The aircraft seating attachment system of claim 7, wherein the second mounting feature comprises a central opening formed through the second plate and a pedestal, the pedestal comprising a lower ring attached to the second plate and an upper ring attached to the lower ring by way of an internal ring, wherein the lower ring, the internal ring and the upper ring collectively define a central opening aligned above and surrounding the central opening formed through the second plate such that a continuous opening is formed through the second plate and the pedestal.

12. The aircraft seating attachment system of claim 7, wherein the first plate has a second side opposite the first side thereof, the second side configured for mounting to a longitudinally extending left track, and wherein the second plate has a second side opposite the first side thereof, the second side configured for mounting to a longitudinally extending right track, and wherein the left track and right track are parallel to and equidistant from the longitudinally extending track.

13. An aircraft seating attachment system comprising:
a longitudinally extending seat track;
a first plinth plate having a first side attached to the seat track;
a first aircraft seat attached to the first plinth plate;
a second plinth plate having a first side attached to the seat track; and
a second aircraft seat attached to the second plinth plate;
wherein, at least one interlinking feature of the first side of the first plinth plate and at least one interlinking feature of the first side of the second plinth plate interlock at the seat track,
wherein, the first aircraft seat and the second aircraft seat are aligned at essentially equivalent longitudinal positions relative to the seat track, and
wherein at least one of the first plinth plate and the second plinth plate comprises a central opening and a pedestal, the pedestal comprising a lower ring and an upper ring attached to the lower ring by way of an internal ring, wherein the lower ring, the internal ring and the upper ring collectively define a central opening aligned above and surrounding the central opening formed through at least one of the first plinth plate and the second plinth plate such that a continuous opening is formed through at least one of the first plinth plate and the second plinth plate and the pedestal.

14. The aircraft seating attachment system of claim 13, wherein the first interlinking feature comprises at least two first support plates extending laterally from the first side of the first plate, and wherein the second interlinking feature comprises at least one second support plate extending laterally from the first side of the second plate and between the two first support plates.

15. The aircraft seating attachment system of claim 13, wherein the first interlinking feature comprises at least two first support plates extending laterally from the first side of the first plate, wherein the second interlinking feature comprises at least two second support plates extending laterally from the first side of the second plate, and wherein the first support plates are interdigitated with the second support plates.

16. The aircraft seating attachment system of claim 15, wherein each first support plate and each second support plate has a respective slot-shaped opening for receiving a connector for attachment to the seat track, and wherein the slot-shaped openings of the first support plates are perpendicular to the slot shaped openings of the second support plates.

17. The aircraft seating attachment system of claim 13, further comprising a left seat track and a right seat track that are parallel to and equidistant from the longitudinally extending seat track, wherein the first plinth plate has a second side opposite the first side thereof and attached to the left seat track, and wherein the second plate has a second side opposite the first side thereof and attached to the right seat track.

18. The aircraft seating attachment system of claim 13, wherein at least one of the first aircraft seat and second aircraft seat is a swivel seat.

* * * * *